HUGH E. RIORDAN
WILLIAM A. HENDRICKS
MARTIN MALONE
INVENTORS

Oct. 19, 1965
H. E. RIORDAN ETAL
3,213,376
DIGITAL VELOCITY METER
Filed July 9, 1962
3 Sheets-Sheet 2
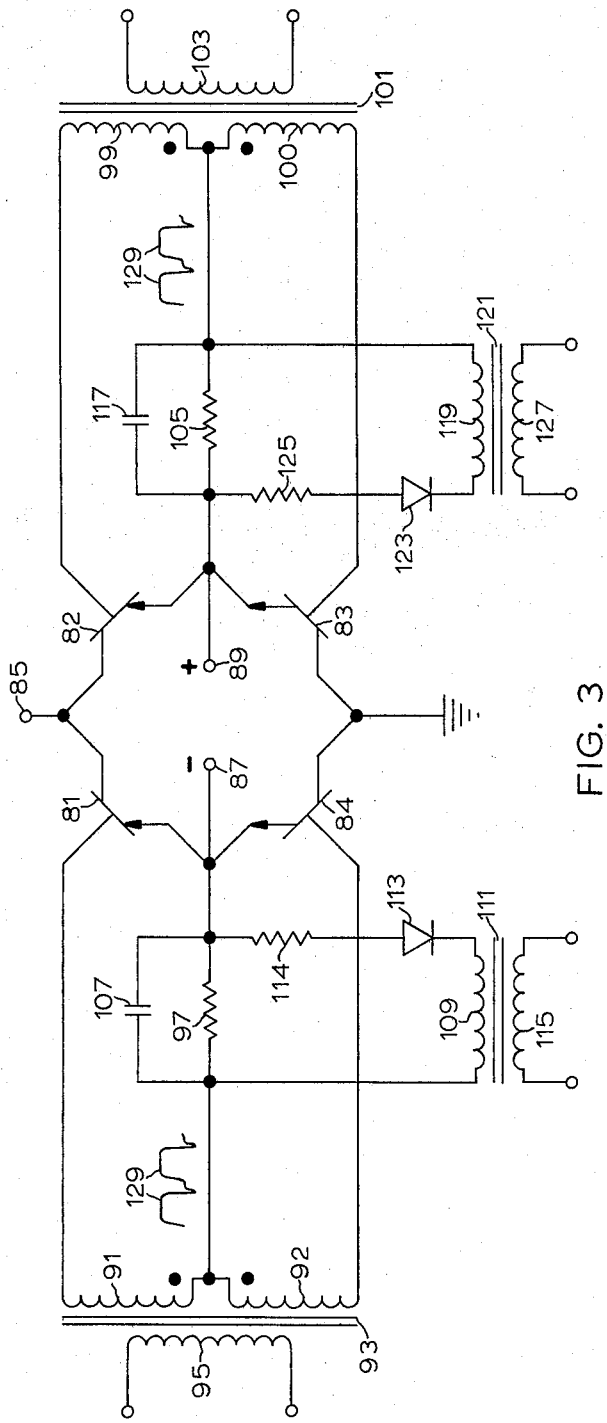
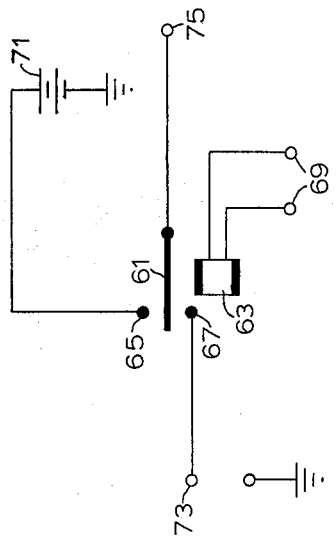
HUGH E. RIORDAN
WILLIAM A. HENDRICKS
MARTIN MALONE
INVENTORS
BY S.A. Giarratana
George B. Oujevolk
ATTORNEYS

HUGH E. RIORDAN
WILLIAM A. HENDRICKS
MARTIN MALONE
INVENTORS

ATTORNEYS

United States Patent Office 3,213,376
Patented Oct. 19, 1965

3,213,376
DIGITAL VELOCITY METER
Hugh E. Riordan, Wyckoff, William A. Hendricks, Parsippany, and Martin Malone, Hawthorne, N.J., assignors to General Precision Inc., Little Falls, N.J., a corporation of Delaware
Filed July 9, 1962, Ser. No. 208,498
8 Claims. (Cl. 328—127)

This invention relates to velocity measuring, and more particularly to a velocity measuring system which produces its output in digital form.

A digital velocity meter is an instrument which produces output signals representing velocity in digital form. In one type of digital velocity meter an accelerometer is used to produce an output signal representing the acceleration along its sensitive axis. This output signal is applied to the input of an integrator having a plurality of inputs. The integrator produces an output signal representing the integral of the algebraic sum of the signals applied to its inputs. In response to the output signal of the integrator exceeding reference levels, pulses are applied to the other inputs of the integrator with polarities to reduce the output signal of the integrator. The pulses applied to the integrator are also used as the output pulses of the system. The difference betwen the number of pulses applied to the integrator to change its output signal in one direction and the number of pulses applied to the integrator to change its output signal in the opposite direction will represent the velocity along the sensitive axis of the accelerometer.

In such a velocity meter it is essential that the area under a graph of the amplitude versus time of each of the pulses applied to the integrator be constant, or in other words have a constant integral. This area or integral of a pulse is referred to as the impulse content of a pulse. In the system of the present invention the pulses are formed by amplifying and half wave rectifying a constant frequency sinusoidal supply. The pulses are passed through a low pass filter to produce a D.C. voltage, which is compared with a reference voltage in a chopper. The error signal generated by the chopper is used to control the gain of the amplifier which drives the half wave rectifier. Thus the impulse content of the pulses is maintained constant by the automatic gain control of the amplifier. The use of automatic gain control to maintain the impulse content constant instead of direct feedback makes possible a very highly effective control of loop gain with only a very simple stabilization network since the cutoff frequency of the automatic gain control circuit can be made very low. Moreover, automatic gain control requires much simpler circuitry than other types of control systems.

In the system of the present invention the output signal from the integrator is compared with reference voltages in chopper circuits. Each chopper circuit produces an A.C. output signal having a phase depending upon whether or not the output signal of the integrator is above or below the reference voltage of the chopper circuit. A switching circuit is provided which controls the application of the constant impulse content pulses to the integrator in response to the phase of the output signals from the chopper circuits. The chopper circuits are energized by an A.C. signal which is shifted 90° in phase from the sinusoidal clock signal from which the pulses applied to the integrator are generated. This feature prevents the switching circuit from operating in the middle of a pulse to be applied or being applied to the integrator so that only whole pulses are applied to the integrator. Thus pulse splitting is prevented by energizing the chopper circuits with an A.C. signal shifted in phase 90°. This system of eliminating pulse splitting makes it possible to have broad tolerances on switching operation times and switching delays.

The phases of the output signals of the choppers are detected in the system of the present invention by means of coincidence gates. The use of coincidence gates for this function provides sharp phase discrimination. Moreover, the coincidence gates produce their output signals as pulses and because of this the circuitry of the system can be simplified.

The switching circuit of the system comprises four transistors arranged in a bridge configuration. Two of the transistors are normally biased conductive and the other two transistors are normally biased non-conductive. By means of this arrangement at least one of the pulse inputs of the integrator is always grounded. This feature minimizes drift and saturation problems in the system due to noise.

Accordingly, a principal object of the present invention is to provide an improved digital velocity meter.

Another object of this invention is to provide a highly accurate digital velocity meter with simplified circuitry.

A further object of this invention is to provide a digital velocity meter having broader tolerance on switching times and switching delays in the system.

A still further object of this invention is to minimize drift and saturation problems due to noise in digital velocity meters.

A still further object of this invention is to simplify the circuitry in digital velocity meters without sacrificing accuracy or reliability.

Further objects and advantages of the present invention will become readily apparent as the following detailed description of the invention unfolds and when taken in conjunction with the accompanying drawings, wherein:

FIG. 2 is a circuit diagram of a chopper used in the system to compare an applied D.C. signal with a source of reference voltage;

FIG. 3 is a circuit diagram of the switching circuit used in the system of the present invention.

Figure 1:
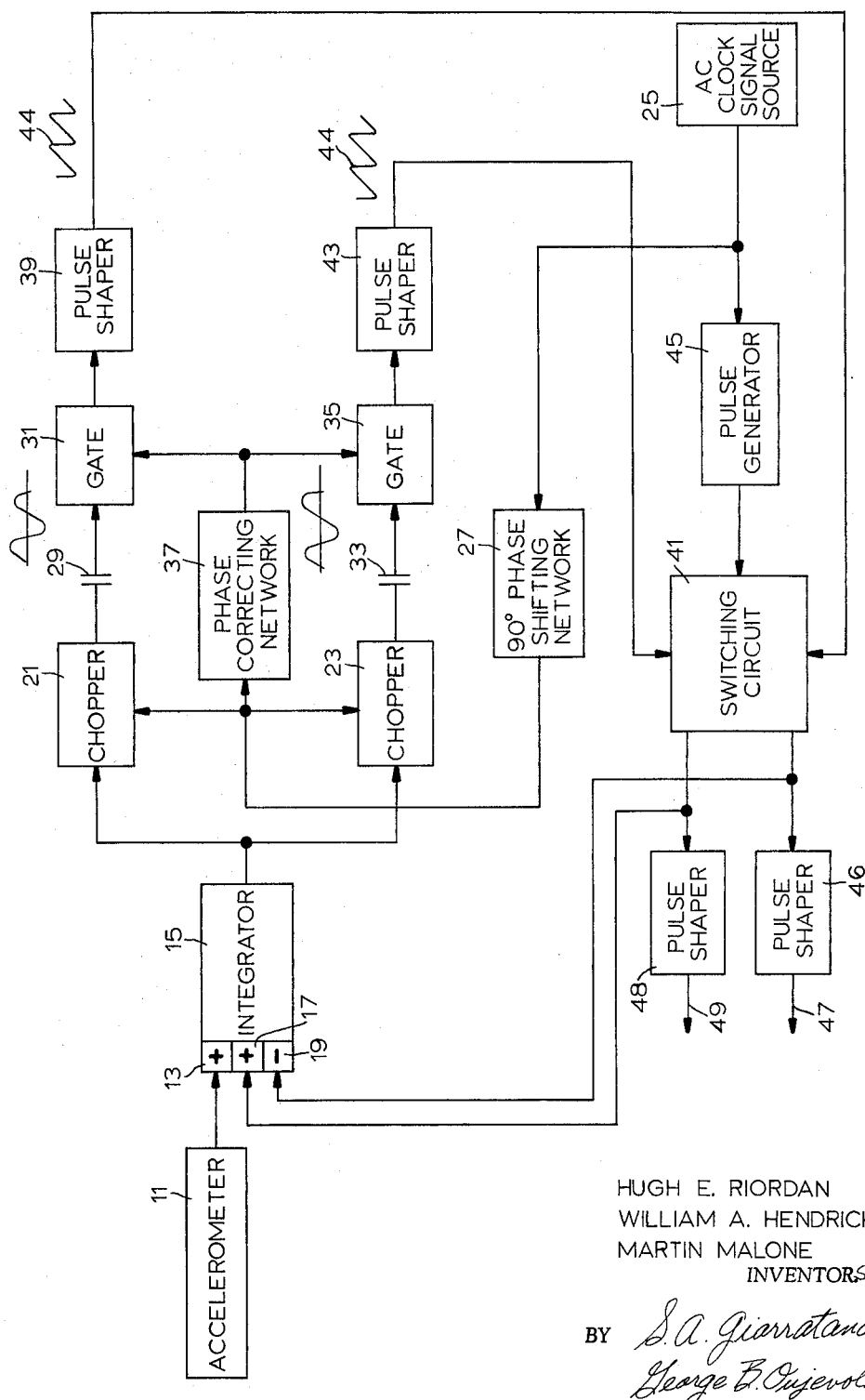
FIG. 1 is a block diagram of the velocity meter of the present invention.

As shown in FIG. 1 an accelerometer 11 produces a D.C. output signal proportional to the acceleration along its sensitive axis. This D.C. output signal is applied to an input 13 of an integrator 15. The integrator 15 has two additional inputs 17 and 19 and produces a D.C. output signal proportional to the integral of the signal applied to the input 13 plus the signal applied to the input 17 minus the signal applied to the input 19. Since the integrator 15 is integrating the output signal of the accelerometer 11, it would produce an output signal proportional to the velocity along the sensitive axis of the accelerometer 11 if no signals were applied to the inputs 17 and 19.

The D.C. output signal of the integrator 15 is applied to a chopper 21 and to a chopper 23. The choppers 21 and 23 are energized by an A.C. signal derived from an A.C. clock signal source 25, which produces a constant frequency sinusoidal output signal. The output signal of the source 25 is shifted in phase 90° by a phase shifting network 27 and is then used to energize the choppers 21 and 23. The chopper 21 compares the D.C. signal applied thereto from the integrator 15 with a positive D.C. reference voltage and produces an A.C. output signal proportional to the difference between the output signal of the integrator 15 and the positive D.C. reference voltage and having a phase representing the polarity of this difference. If the output signal of the integrator 15 is greater than the positive D.C. reference voltage, then the A.C. output signal of the chopper 21 will be in phase with the output signal of the phase shifting network 27, whereas if the output signal of the integrator 15 is less than the positive D.C. reference voltage or is negative, then the output signal of the chopper 21 will be 180° out of phase with the output signal of the phase shifting network 27. The chopper 23 compares the output signal of the integrator 15 with a negative D.C. reference voltage and produces an A.C. output signal having an amplitude proportional to the difference between the output signal of the integrator 15 and the D.C. reference voltage and having a phase representing the polarity of this difference. If the output signal of the integrator 15 is greater, that is more negative, than the negative D.C. reference voltage, then the output signal of the chopper 23 would be in phase with the output signal of the phase shifting network 27. But if the output signal of the integrator 15 is not as negative as the negative D.C. reference voltage or is positive, then the output signal of the chopper 23 will be 180° out of phase with the output signal of the phase shifting network 27. The A.C. output signals of the choppers 21 and 23 will not be precisely in phase or 180° out of phase with the A.C. signal energizing the choppers due to the inductance and inertia of the choppers.

The output signal of the chopper 21 is applied through a capacitor 29 to a coincidence gate 31 and the output signal of the chopper 23 is applied through a capacitor 33 to a coincidence gate 35. The capacitors 29 and 33 serve to block the D.C. components in the output signals produced by the choppers 21 and 23. The A.C. output signal from the phase shifting network 27 is applied though a phase correcting network 37 to the gates 31 and 35. The phase correcting network 37 serves to shift the phase of the signal applied thereby to the gates 31 and 35 to correct for the phase shift caused by the inductance and inertia of the choppers 21 and 23 so that the signal applied to the gates 31 and 35 by the phase correcting network 37 will either be precisely in phase or 180° out of phase with the signals applied to the gates 31 and 35 from the choppers 21 and 23, respectively. Each of the gates 31 and 35 will only procduce an output pulse when it receives positive pulses applied simultaneously to both its inputs. Thus, the gate 31 will only produce output pulses when the output signal of the integrator 15 is greater than the positive D.C. reference voltage to which it is compared in the chopper 21 and the gate 35 will only produce output pulses when the output signal of the integrator 15 is more negative than the negative D.C. reference voltage to which it is compared in the chopper 23. The output pulses of the gates 31 and 35 are each produced only on the positive half cycles of the output signal of the phase correcting network 37 and are therefore separated by the negative half cycles of the output signal of the phase correcting network 37 as in a half wave rectified A.C. signal.

The output pulses of the gate 31 are shaped by a pulse shaper 39 and applied to a switching network 41 and the output pulses of the gate 35 are shaped by a pulse shaper 43 and applied to the switching network 41. The pulse shaper 39 and 43 produce triangular shaped pulses, which are illustrated at the outputs of the pulse shapers 39 and 43 in FIG. 1 and which are designated by the reference number 44. As shown in FIG. 1, the pulses 44 have sharp trailing edges and relatively gradual leading edges and are lengthened out so that each pulse 44 terminates just a little before the next succeeding pulse 44 begins.

The sinusoidal signal produced by the clock source 25 is applied to a pulse generator 45, which in response to each pulse from the source 25 applies a pulse to the switching circuit 41. Each output pulse of the pulse generator 45 is produced simultaneously with each positive half cycle of the A.C. clock signal produced by the source 25. Because the choppers 21 and 23 are energized by an A.C. signal which is shifted in phase 90°, each triangular output pulse of the pulse shapers 39 and 43 will commence approximately one quarter of the cycle prior to the start of the corresponding output pulse of the pulse generator 45. Because the output pulses 44 from the pulse shapers 39 and 43 are lengthened out, they each will terminate after the termination of the corresponding output pulse of the pulse generator 45. Thus the pulse generator 45 will produce an output pulse simultaneously with each of the triangular output pulses 44. The shape of the triangular output pulses 44 is selected such that whenever one of these output pulses is produced, the output pulse of the pulse generator 45 occurring simultaneously therewith will start and end during the gradual leading edge portion of the triangular output pulse.

The pulse shaper 39 will apply pulses to the switching circuit 41 whenever the D.C. output signal of the integrator 15 is greater than the positive reference voltage to which it is compared in the chopper 21. The pulse shaper 43 will apply a pulse to the switching circuit 41 whenever the D.C. output voltage of the integrator 15 is more negative than the negative reference voltage to which it is compared in the chopper 23. Each pulse applied to the switching circuit 41 by the pulse generator 45 simultaneously with a pulse 44 from the pulse shaper 39 is passed by the switching circuit 41 to the input 19 of the integrator 15 and each pulse applied to the switching circuit 41 by the pulse generator 45 simultaneously with a pulse 44 from the pulse shaper 43 is passed by the switching circuit 41 to the input 17 of the integrator 15. Thus when the D.C. output voltage of the integrator 15 is greater than the positive reference voltage to which it is compared in the chopper 21, the switching circuit 41 will pass pulses from the pulse generator 45 to the input 19 of the integrator 15, where they will be integrated. Since the signal applied to the input 19 is subtracted rather than added in the integrator 15, the pulses applied to the input 19 will have the effect of reducing the D.C. output voltage of the integrator 15. The switching circuit 41 will continue to pass the output pulses from the pulse generator 45 to the input 19 until the D.C. output voltage of the integrator 15 becomes less than the positive reference voltage to which it is compared in the chopper 21. When the D.C. output voltage of the integrator 15 is more negative than the negative reference voltage to which it is compared in the chopper 23, then the switching circuit 41 will pass the pulses produced by the generator 45 to the input 17 of the integrator 15. The integrator 15 will integrate the pulses applied to the input 17, and therefore the D.C. output voltage of the integrator 15 will become less negative. The switching circuit 41 will continue to apply the output pulses of the generator 45 to the input 17 until the D.C. output voltage of the integrator 15 becomes less negative than the negative D.C. reference voltage to which it is compared in the chopper 23. The pulse generator 45 controls the impulse content of the pulses that it generates to be constant so that each output pulse of the pulse generator 45 applied to the integrator 15 will change the output voltage of the integrator 15 by exactly the same amount.

The pulses passed to the input 19 by the switching circuit 41 are also applied to a pulse shaper 46 and the pulses applied to the input 17 by the switching circuit 41 are also applied to a pulse shaper 48. In response to each pulse applied from the switching circuit 41 the pulse shaper 46 produces an output pulse on an output channel 47 of the system and in response to each pulse applied from the switching circuit 41 the pulse shaper 49 applies an output pulse to an output channel 49 of the system.

With this system the number of pulses produced on the channels 47 and 49 will represent the integral of the output signal of the accelerometer 11, or in other words the velocity along the sensitive axis of the accelerometer 11. For example, if the accelerometer 11 produces a positive output signal indicating that there has been an acceleration to a new velocity, the integrator 15 will integrate the output signal of the accelerometer 11 and produce a positice D.C. voltage at its output representing this change in velocity. Pulses will then be applied to the input 19 by the switching circuit 41 until the output voltage of the integrator 15 is again reduced below the positive reference voltage to which it is compared in the chopper 21. Since the D.C. voltage at the output of the integrator 15 is reduced by integrating pulses having a constant impulse content, the number of pulses which must be applied to the integrator 15 to reduce the D.C. output voltage below the positive D.C. reference voltage will be proportional to the change in velocity. Thus the pulses produced on channel 47 will be proportional to this change in velocity. When the accelerometer 11 produces a negative output signal indicating a change in velocity in the opposite direction, the switching circuit 41 will apply a number of pulses proportional to this change in velocity to the input 17 of the integrator 15 and as a result the number of pulses produced on the channel 49 will be proportional to the change in velocity in this direction. Thus, the difference between the number of pulses produced on the channel 47 and on the channel 49 will represent the velocity along the sensitive axis of the accelerometer 11.

FIG. 2 illustrates the circuit of the chopper 21. As shown in FIG. 2, the circuit of the chopper makes use of a solenoid operated switch comprising an armature 61 controlled by a solenoid 63. The armature 61 has two positions. In one position it makes contact with a terminal 65 and in the other position it makes contact with a terminal 67. The solenoid 63 is energized by a source of A.C. voltage applied across terminals 69. In the chopper 21 this voltage is the voltage applied from the phase shifting network 27. On positive half cycles of the applied A.C. voltage, the solenoid 63 will position the armature 61 to contact the terminal 67 and on negative half cycles of the applied A.C. voltage the solenoid 63 will position the armature 61 to contact the terminal 65. A source of positive reference voltage 71 is connected between the terminal 65 and ground and the D.C. input signal which is to be compared with the source of reference voltage 71 is applied to an input terminal 73, which is connected directly to the terminal 67. The armature 61 is connected directly to an output terminal 75. This circuit will produce an A.C. signal at the output terminal 75 which will be in phase with the signal applied across the terminals 69 if the signal voltage applied to terminal 73 is greater than the reference voltage of the source 71 and out of phase with the A.C. signal applied across terminals 69 if the signal voltage applied to input terminal 73 is less than the reference voltage of the source 71 or negative. The circuit to the chopper 23 is the same as that of the chopper 21 except that the source of reference voltage is negative and the connections to the solenoid are reversed so that on positive half cycles the armature 61 will contact terminal 65 and on negative half cycles the armature 61 will contact terminal 67.

The switching circuit 41 of the system is illustrated in FIG. 3. As shown in FIG. 3, this circuit comprises two PNP resistors 81 and 82 and two NPN transistors 83 and 84 connected in a bridge arrangement. The collectors of the transistors 81 and 82 are connected together and to an input terminal 85. The pulses from the pulse generator 45 having the constant impules content are applied to the input terminal 85. The collectors of the transistors 83 and 84 are connected together and to ground. The emitters of the transistors 81 and 84 are connected together and to an output terminal 87. The emitters of the transistors 82 and 83 are connected together and to an output terminal 89. The terminal 87 is the output terminal of the switching circuit 41 which is connected to the input 17 of the integrator 15 and the terminal 89 is the output terminal of the switching circuit 41 which is connected to the input 19 of the integrator 15. Two secondary widnings 91 and 92 of a transformer 93 are connected in series between the bases of the transistors 81 and 84. The primary winding of the transformer 93 is designated by the reference number 95. The output pulses from the pulse shaper 43 are applied across this primary winding. The junction between the secondary windings 91 and 92 is connected to the junction between the transistors 81 and 84 through a resistor 97. The secondary windings 91 and 92 are poled so that when a positive going pulse is applied to the primary winding 95, the resulting pulses induced in the secondary windings 91 and 92 will make the emitters of the transistors 81 and 84 positive with respect to their bases. Two secondary windings 99 and 100 of a transformer 101 are connected in series between the bases of the transistors 82 and 83. The primary winding of the transformer 101 is designated by the reference number 103. The output pulses of the pulse shaper 39 are applied across the primary winding 103. The junction between the secondary windings 99 and 100 is connected to the junction between the transistors 82 and 83 through a resistor 105. The secondary windings 99 and 100 are poled so that when a positive going pulse is applied to the primary winding 103, the resulting pulses induced in the secondary windings 99 and 100 will make the emitters of the transistors 82 and 83 positive with respect to their bases. The resistor 97 is shunted by a capacitor 107. The secondary winding 109 of a transformer 111 is connected in series with a diode rectifier 113 and a resistor 114 across the resistor 97. The primary winding of the transformer 111 is designated by the reference number 115. The resistor 105 is shunted by a capacitor 117. The secondary winding 119 of a transformer 121 is connected in series with a diode rectifier 123 and a resistor 125 across the resistor 105. The primary winding of the transformer 121 is designated by the reference number 127. The primary windings 115 and 127 are energized by an A.C. source of power which conveniently may be the A.C. clock signal source 25. The half wave rectifier 113, in combination with the capacitor 107, produces a filtered D.C. voltage across the resistor 97 from the A.C. voltage induced in the secondary winding 109. The half wave rectifier 113 is poled so that the minus side of the D.C. voltage is produced at the junction between the transistors 81 and 84 and the plus side of the D.C. voltage is produced at the center tap of the secondary winding 91. This D.C. voltage produced across the resistor 97 biases the transistor 84 to be normally conducting and biases the transistor 81 to be normally non-conducting. The half wave rectifier 123, in combination with the capacitor 117, produces a filtered D.C. voltage across the resistor 105 from the A.C. voltage induced in the secondary winding 119 of the transformer 121. The rectifying diode 123 is connected with a polarity to produce the negative side of the D.C. voltage across resistor 105 at the junction between the transistors 82 and 83 and the positive side of the D.C. voltage at the center tap of the secondary winding 99. This D.C. voltage produced across resistor 105 biases the transistor 83 to be normally conducting and the transistor 82 to be normally non-conducting. When the transistors 81 and 82 are non-conducting, the pulses applied to the input terminal 85 from the pulse generator 45 are prevented from being transmitted to the output terminals 87 and 89. When the pulse shaper 43 applies a pulse to the primary winding 95, the resulting pulse which is induced in the secondary winding 91 will cause the transistor 81 to become conducting and the transistor 84 to become non-conducting. Thus, the pulse applied to the terminal 85 simultaneously with the pulse which is applied to the primary winding 95 will pass through the transistor 81 to the output terminal 87 and from there to the input 17 of the integrator 15. Similarly, when the pulse shaper 39 applies a pulse to the primary winding 103 of the transformer 101, the resulting pulse induced in the secondary winding 99 will cause the transistor 82 to become conducting and the transistor 83 to become non-conducting. Thus, the pulse from the pulse generator 45 applied to the terminal 85 simultaneously with the pulse applied to the primary winding 103 will pass through the transistor 82 to the output terminal 89.

When the triangular pulses from the pulse shapers 39 and 43 are applied to the primary windings 95 and 103, they will induce flat-topped, pillow-shaped pulses followed by negative spikes in the secondary windings 91 and 99. The shapes of these pulses are illustrated in FIG. 3 and are designated by the reference number 129. The negative spikes of the pulses 129 are produced by the trailing edges of the triangular pulses 44 produced by the pulse shapers 39 and 43 and occur during the intervals between the pulses produced by the pulse generator 45. The leading edges of the triangular pulses 44 produce the flat, positive portion of the pulses 129. Since the output pulses of the pulse generator 45 start and end during the lead edge portions of the triangular pulses 44, they will start and end during the flat, positive portions of the pulses 129. As a result, the impulse content of the pulses transmitted through the transistors 81 and 82 is not effected by the pulses 129.

Figure 4:
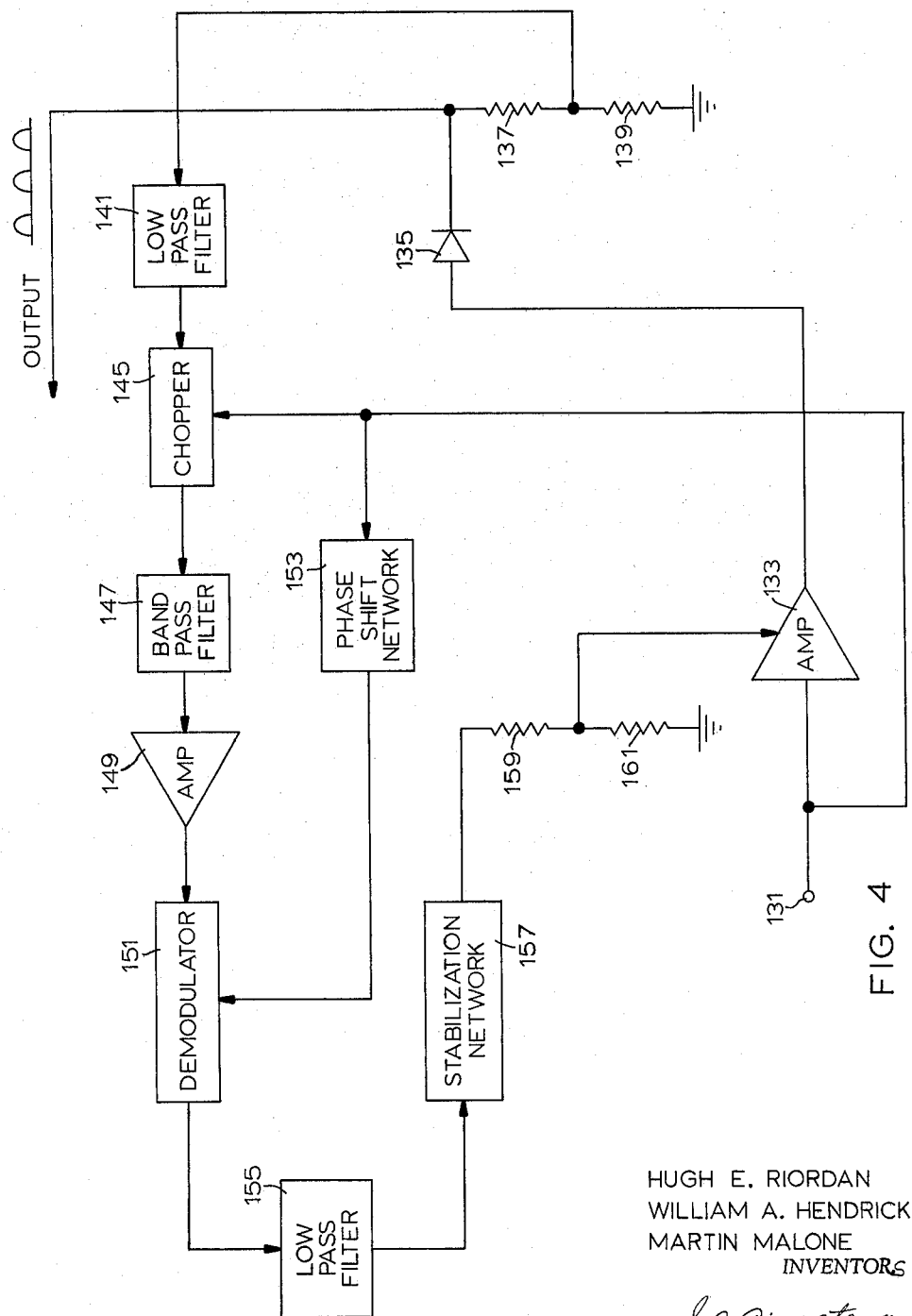
FIG. 4 is a block diagram of the pulse generator of the system for producing the pulses having a constant impulse content.

The details of the pulse generator 45 are illustrated in the block diagram of FIG. 4. The A.C. clock signal from the source 25 is applied to the pulse generator 45 at an input terminal 131. This A.C. sinusoidal signal is amplified by a variable gain amplifier 133 and then half wave rectified by a rectifying diode 135. The half wave rectified output from the rectifying diode 135 is the output from the pulse generator 45 applied to the switching circuit 41. The half wave rectified output from the diode 135 is attenuated in the circuit of the pulse generator 45 in a voltage divider network comprising resistors 137 and 139 connected in series between the output from the diode 135 and ground. The attenuated output at the junction between resistors 137 and 139 is applied through a low pass filter 141 to a chopper 145. The low pass filter 141 converts the half wave rectified output to a filtered D.C. voltage proportional to the impulse content of the output pulses from the diode 135. The chopper 145 comprises a comparison circuit identical to that shown in FIG. 2 and it compares the D.C. output voltage of the filter 141 with a source of reference voltage. The chopper 145 generates an A.C. error signal having a phase depending on whether the output voltage of the low pass filter 141 is above or below the reference voltage, and having a magnitude proportional to the difference. The chopper 145 is energized directly from the A.C. clock signal applied to the input terminal 131. The A.C. output signal of the chopper 145 is filtered by a band pass filter 147 and then amplified by an amplifier 149 and applied to a demodulator 151. The demodulator 151 also receives the A.C. clock signal applied to the input terminal 131 after it has passed through a phase shift network 153. The phase shift network 153 shifts the phase of the clock signal to compensate for any shift in the output signal of the chopper 145 so that the signal applied to the demodulator 151 by the phase shift network 153 is either precisely in phase or 180° out of phase with the output signal of the chopper 145. The demodulator 151, in response to the signals applied thereto, produce a D.C. output signal voltage proportional to the A.C. output voltage of the amplifier 149 and having a polarity depending upon whether or not the output signal of the amplifier 149 is in phase or out of phase with the output signal of the phase shift network 153. The D.C. output signal of the demodulator 151 is applied through a low pass filter 155 and a stabilization network 157 to a voltage divider comprising resistors 159 and 161 connected in series between the output of the stabilization network 157 and ground. The voltage divider comprising resistors 159 and 161 attenuates the output signal of the stabilization network 157 and applies it to the gain controlling input of the amplifier 133. The demodulator 151 is controlled by the phase shift network 153 so that the signal applied to the variable gain input of the amplifier 133 will counteract any difference between the output voltage of the low pass filter 141 and the reference voltage of the chopper 145 and drive this difference to zero. In this manner the impulse content of the output pulses of the rectifying diode 135 is maintained constant.

Thus, there is provided a reliable digital velocity meter which is accurate to one part in ten thousand, and this accuracy is achieved with no section or part of the system requiring performance of circuits or circuit elements which is not easily obtainable. The above description is of a preferred specific embodiment of the invention, and many modifications may be made thereto without departing from the spirit and scope of the invention, which is defined in the appended claims.

What is claimed is:

1. A digital velocity meter comprising integrating means having first and second inputs and operable to generate an output signal representing the integral of the difference between the signals applied to said first and second inputs, means to apply a signal continuously representing acceleration to the first input of said integrating means, means to generate a train of constant impulse content pulses, comparison means, including a source of reference potential, responsive to the output signal of said integrating means to generate an A.C. signal shifted 90° in phase from the phase of said train and having a polarity depending upon whether or not the output signal of said integrating means is above or below said reference potential, and switching means responsive to the polarity of the output signal of said comparison means to selectively apply said pulse train to the second input of said integrating means.

2. A digital velocity meter comprising an integrating means having first, second and third inputs and operable to generate an output signal representing the integral of the signal applied to said first input plus the signal applied to said second input minus the signal applied to said third input, means to apply a signal continuously representing acceleration to the first input of said integrating means, means to generate a pulse train of constant impulse content pulses, comparison means, including a source of reference potential, responsive to the output signal of said integrating means to generate a first A.C. signal shifted 90° in phase from the phase of said pulse train and having a polarity depending upon whether or not the output signal of said integrating means is more positive than said reference potential and a second A.C. signal shifted 90° in phase from the phase of said pulse train and having a polarity depending upon whether or not the output signal of said integrating means is more negative than said reference potential, and switching means responsive to the polarities of the output signals of said first and second A.C. signals to selectively apply said pulse train to said second and third inputs.

3. A digital velocity meter comprising integrating means having first and second inputs and operative to generate an output signal representing the integral of the difference between the signals applied to said first and second inputs, means to apply a signal continuously representing acceleration to the first input of said integrating means, comparison means, including a source of reference potential, responsive to the output signal of said integrating means to generate an A.C. signal having a polarity depending upon whether or not the output signal of said integrating means is above or below said reference potential, a coincidence gate having first and second inputs and operative to produce an output pulse in response to a pulse of predetermined polarity applied to the first input thereof simultaneously with a pulse of predetermined polarity applied to the second input thereof, means to apply the output signal of said comparison means to the first input of said coincidence gate, means to apply an A.C. reference signal of constant phase having a frequency equal to the frequency of the output signal of said comparison means and having a phase either in phase or 180° out of phase with the output signal of said comparison means to the second input of said coincidence gate, and means responsive to each output pulse of said coincidence gate to apply a pulse of constant impulse content to the second input of said integrating means.

4. A digital velocity meter comprising integrating means having first and second inputs and operative to generate an output signal representing the integral of the difference between the signals applied to said first and second inputs, means to apply a signal continuously representing acceleration to the first input of said integrating means, means to generate a pulse train of constant impulse content pulses, comparison means, including a source of reference potential, responsive to the output signal of said integrating means to generate an A.C. signal shifted 90° in phase from the phase of said pulse train and having a polarity depending upon whether or not the output signal of said integrating means is above or below said reference potential, a coincidence gate having first and second inputs and operative to produce an output pulse in response to a pulse of predetermined polarity applied to the first input thereof simultaneously with a pulse of predetermined polarity applied to the second input thereof, means to apply the A.C. output signal of said comparison means to the first input of said coincidence gate, means to apply an A.C. reference signal of constant phase having a frequency equal to the frequency of the output signal of said comparison means and having a phase either in phase or 180° out of phase with the output signal of said comparison means to the second input of said coincidence gate, pulse shaping means to lengthen out the output pulses of said coincidence gate, and switching means responsive to the simultaneous application of an output pulse from said pulse shaping means and a pulse from said pulse train to pass the pulse of said pulse train to the second input of said integrating means.

5. A digital velocity meter comprising an integrating means having first and second inputs and operable to produce an output signal representing the integral of the difference between the signals applied to said first and second inputs, means to apply a signal continuously representing acceleration to the first input of said integrating means, an A.C. source, a variable gain amplifier connected to amplify the output signal of said A.C. source, a half wave rectifier connected to rectify the output signal of said amplifier, means responsive to changes in the impulse content of the output pulses of said rectifier to control the gain of said variable gain amplifier to counteract any changes in said impulse content, and switching means responsive to the output signal of said integrating means exceeding a reference level to apply the output pulses of said half wave rectifier to the second input of said integrating means.

6. A digital velocity meter comprising an integrating means having first, second and third inputs and operative to produce an output signal representing the integral of the signal applied to said first input plus the signal applied to said second input minus the signal applied to said third input, means to apply a signal continuously representing acceleration to the first input of said integrating means, and A.C. source, a variable gain amplifier connected to amplify the output signal of said A.C. source, a half wave rectifier connected to rectify the output signal of said amplifier, means responsive to changes in the impulse content of the output pulses of said rectifier to control the gain of said variable gain amplifier to counteract any changes in said impulse content, and switching means responsive to the output signal of said integrating means being more positive than a reference level to apply the output pulses of said half wave rectifier to the third input of said integrating means and responsive to the output signal of said integrating means being more negative than a reference level to apply the output pulses of said half wave rectifier to the second input of said integrating means.

7. A digital velocity meter comprising an integrating means having first and second inputs and operable to produce an output signal representing an integral of the difference between the signals applied to said first and second inputs, means to apply a signal continuously representing acceleration to the first input of said integrating means, means to generate a train of constant impulse content pulses, a first switching means connected between the second input of said integrating means and ground, a second switching means connected between the output of said means to generate a train of pulses and the second input of said integrating means, means normally biasing said first switching means conductive and said second switching means non-conductive, means responsive to the output signal of said integrating means exceeding a reference level to make said first switching means non-conductive and said second switching means conductive.

8. A digital velocity meter comprising an integrating means having first, second and third inputs and operable to produce an output signal representing the integral of the signal applied to said first input plus the signal applied to said second input minus the signal applied to said third input, means to apply a signal continuously representing acceleration to the first input of said integrating means, means to generate a train of constant impulse content pulses, a first switching means connected between the second input of said integrating means and ground, second switching means connected between the second input of said integrating means and the output of said means to generate a train of pulses, third switching means connected between the third input of said integrating means and ground, fourth switching means connected between the third input of said integrating means and the output of said means to generate a train of pulses, means to bias said first and third switching means normally conductive and said second and fourth switching normally non-conductive, means responsive to the output signal of said integrating means being more positive than a reference level to make said third switching means non-conductive and said fourth switching means conductive and responsive to the output signal of said integrating means being more negative than a reference level to make said first switching means non-conductive and said second switching means conductive.

References Cited by the Examiner

UNITED STATES PATENTS

| | | | |
|---|---|---|---|
| 2,582,596 | 1/52 | MacRae | 328—133 |
| 2,821,639 | 1/58 | Bright | 307—88.5/1 |
| 2,905,888 | 9/59 | Carney | 324—83 |
| 2,924,723 | 2/60 | Van Overbeek | 307—88.5 |
| 3,028,550 | 3/62 | Naydan | 340—347 |
| 3,094,629 | 6/63 | Ostroff et al. | 308—88.5 |

OTHER REFERENCES

I.R.E. Dictionary TK 17804–15, page 29.

ARTHUR GAUSS, *Primary Examiner.*